United States Patent
Choi

(10) Patent No.: US 7,554,601 B2
(45) Date of Patent: Jun. 30, 2009

(54) DIGITAL VIDEO CAMERA WITH AUTOMATIC WHITE BALANCE AND A METHOD THEREOF

(75) Inventor: Hyung-Ok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 11/140,985

(22) Filed: Jun. 1, 2005

(65) Prior Publication Data

US 2006/0007348 A1    Jan. 12, 2006

(30) Foreign Application Priority Data

Jul. 8, 2004    (KR) .................. 10-2004-0053028

(51) Int. Cl.
   *H04N 5/235*    (2006.01)
(52) U.S. Cl. ........................ 348/362; 348/363
(58) Field of Classification Search ... 348/223.1–225.1, 348/229.1, 362–366
   See application file for complete search history.

(56) References Cited

U.S. PATENT DOCUMENTS 5,270,802 A * 12/1993 Takagi et al. ................ 348/655

FOREIGN PATENT DOCUMENTS

| JP | 04-000989 | 1/1992 |
|---|---|---|
| JP | 04-252588 | 9/1992 |
| JP | 07-322283 | 12/1995 |
| KR | 1995-0072292 | 12/1995 |
| KR | 1996-0018774 | 12/1997 |
| KR | 1998-0053473 | 7/2000 |

\* cited by examiner

*Primary Examiner*—David L Ometz
*Assistant Examiner*—Akshay Trehan
(74) *Attorney, Agent, or Firm*—Roylance, Abrams, Berdo & Goodman, L.L.P.

(57) ABSTRACT

Disclosed is a digital video camera performing white balance adjustment according to a photographing condition. The digital video camera with automatic exposure comprises an iris state detector for outputting an electrical signal with a predetermined magnitude corresponding to the status of an iris, a memory for saving a threshold value to be compared with the magnitude of the electrical signal, and a controller for comparing the magnitude of the electrical signal output from the iris state detector with the threshold value, determining the photographing condition after a predetermined determination time is elapsed, and adjusting the determination time according to the difference between the magnitude of the electrical signal and the threshold value.

12 Claims, 3 Drawing Sheets

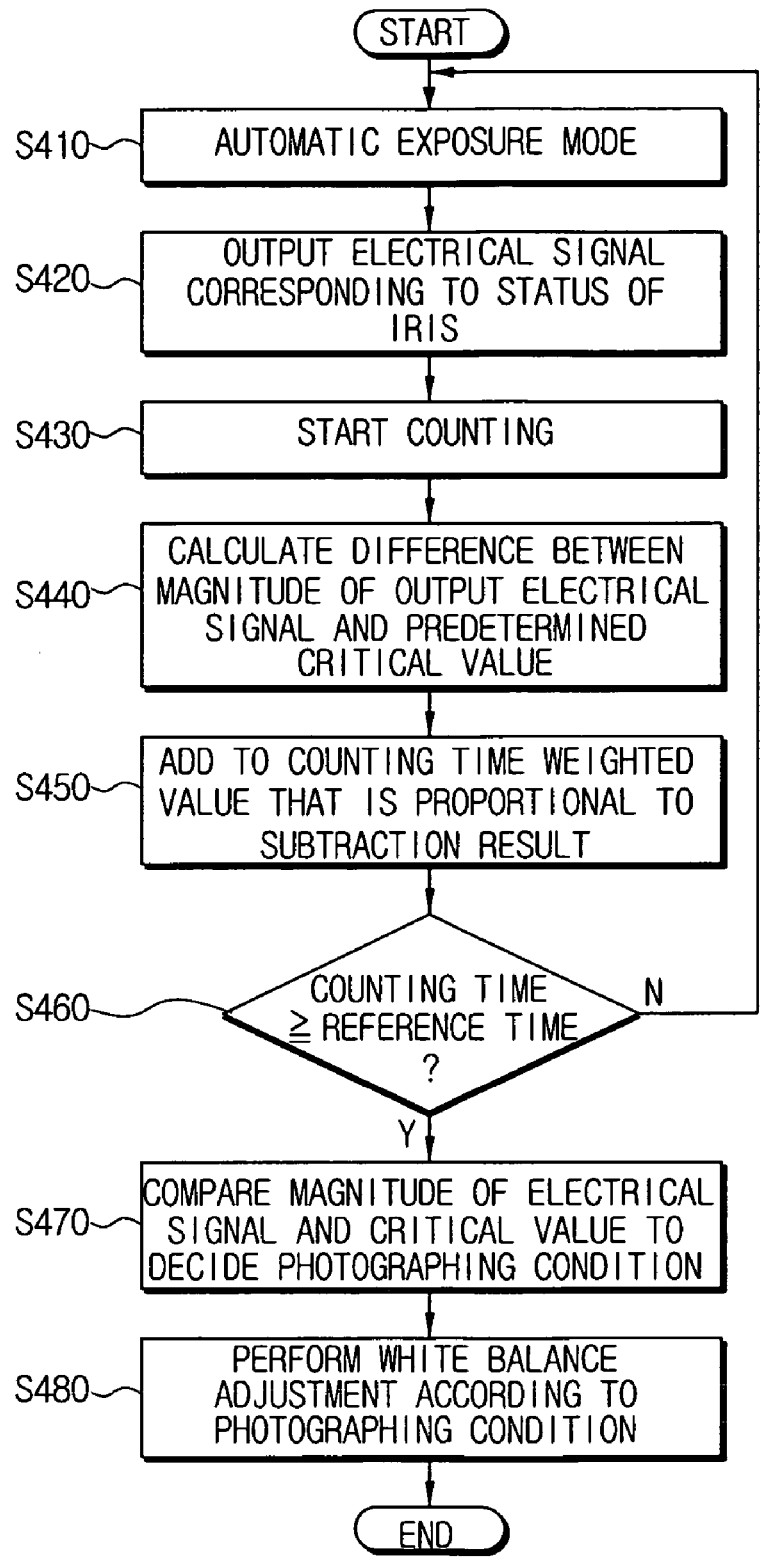

DIGITAL VIDEO CAMERA WITH AUTOMATIC WHITE BALANCE AND A METHOD THEREOF

CROSS-REFERENCE TO RELATED APPLICATIONS

This application claims benefit under 35 U.S.C. § 119(a) of Korean Patent Application entitled "Digital Video Camera With Automatic White Balance And a Method Thereof" and assigned Serial No. 2004-53028, filed on Jul. 8, 2004, the entire content of which is hereby incorporated by reference.

BACKGROUND OF THE INVENTION

1. Field of the Invention

The present invention generally relates to a digital video camera having automatic white balance and a method thereof. More specifically, the present invention relates to a digital video camera capable of performing automatic white balance adjustment according to the photographing condition such as whether it is indoor or outdoor, and determining the photographing condition at different speeds on the basis of the status of an iris.

2. Description of the Related Art

Technical advances in the electronics industry have brought the development of many types of cameras having diverse functions. Cameras now have automatic exposure and automatic white balance features. In automatic exposure or auto-iris mode, the lighting condition is measured by means of an exposure meter to automatically control an iris for ultimately creating an optimal exposure setting for the film condition.

In automatic white balance mode, the difference between the red component and the blue component comprised in the light from a light source is detected, and weights of red and blue are compensated, respectively, in a camcorder for maintaining color balance.

Meanwhile, although an object may be photographed by the exactly same camera, the color(s) of the photographed image can be different depending on lighting conditions. This is because most light sources have a certain color temperature expressed in Kelvin (K). The color temperature indicates light quality of a light source on the basis of the electromagnetic wave emitted from the light. To give averages of color temperature of conventional light sources, a bright midday sun is in range of 5,500-6,000K, a lightly overcast sky 6,000-7,000K, a fluorescent lamp 3,200-3,600K, and a candle 1,800-2,000K. Therefore, to perform white balance adjustment through the camera having an automatic white balance feature, the first thing to be done is finding out the type of a light source, that is, whether it is natural sunlight or artificial light.

FIG. 1 is a flow chart illustrating white balance adjustment of a conventional digital video camera having automatic exposure and automatic white balance. Referring to FIG. 1, first, the digital video camera checks a hall value corresponding to the current status of an iris that has been automatically determined according to the automatic exposure feature of the camera at S10. When a hall sensor outputs a voltage of a certain magnitude corresponding to the openness of the iris, the output voltage is then converted to digital or numeric value. This digital value is a hall value.

Next, the hall value is compared with a predetermined threshold value at step S20. At this time, the threshold value can be empirically determined.

In an outdoor place where natural sunlight is present, the iris is opened just a little so the hall value is small. On the other hand, in an indoor place where artificial light is present, the iris is opened fully so the hall value is large.

Therefore, if the hall value turns out to be equal to or greater than the threshold value the camera determines that it is an indoor place at step S30, but if the hall value is less than the threshold value the camera determines that it is an outdoor place at step S40.

On the basis of the determination result, the camera performs white balance adjustment at step S50. The white balance adjustment is different whether it is indoor or outdoor.

However, in a conventional digital video camera, white balance adjustment is so sensitive to even tiny changes of the hall value especially when the hall value and the threshold value are approximate. In such case, color sensitivity of a photographed image also changes very subtly. For instance, the hall value in a cloudy evening is usually very close to the threshold value. If a user zooms in to photograph an object with low color sensitivity, the hall value will be changed but subtly during the zoom process. Since the white balance adjustment gets changed continuously in correspondence to the changes in the hall value, the user often finds it very difficult to record moving images having stable color sensitivity.

SUMMARY OF THE INVENTION

An aspect of the present invention is to solve at least the above problems and disadvantages and to provide at least the advantages described below. Accordingly, an aspect of the present invention is to provide a digital video camera capable of preventing unnecessary white balance adjustment by performing white balance adjustment according to a photographing condition and determining the photographing condition at different speeds on the basis of the status of an iris, and a method thereof.

To achieve the above aspects and advantages, a digital video camera having automatic exposure is provided. The digital video camera comprises an iris state detector for outputting an electrical signal with a predetermined magnitude corresponding to the status of an iris, a memory for saving a threshold value to be compared with the magnitude of the electrical signal, and a controller for comparing the magnitude of the electrical signal output from the iris state detector with the threshold value to determine a determination time of a photographing condition, and determining the photographing condition according to the difference between the magnitude of the electrical signal and the threshold value after the determination time is elapsed.

The digital video camera further comprises a counter for counting the amount of time elapsed since the output of the electrical signal from the iris state detector.

In an exemplary embodiment of the present invention, the controller adds a predetermined weight, which is proportional to the difference between the magnitude of the electrical signal and the threshold value, to a counting time provided from the counter, and if the counting time with the weight equals to a predetermined reference time the controller determines that the determination time has elapsed and thus determines the photographing condition.

The digital video camera further comprises a white balance unit for performing white balance adjustment according to the photographing condition provided by the controller.

The iris state detector outputs a hall value corresponding to the openness of the iris by means of a hall sensor.

In an exemplary embodiment of present invention, if the hall value is equal to or greater than the threshold value the controller determines that the photographing condition is an indoor place under an artificial light source, and if the hall value is less than the threshold value the controller determines that the photographing condition is an outdoor place under natural sunlight.

Another aspect of the present invention is to provide a method of white balance adjustment in a digital video camera with automatic aperture, The method comprises the steps of outputting an electrical signal with a predetermined magnitude corresponding to the status of the iris, calculating a difference between the magnitude of the electrical signal and a predetermined threshold value, adjusting a determination time on a photographing condition of the digital video camera in accordance with the difference, and comparing the magnitude of the electrical signal with the threshold value after the determination time is elapsed, and determining the photographing condition based on the comparison result.

The step of adjusting the determination time on the photographing condition comprises the sub-steps of counting the amount of time elapsed since the output of the electrical signal, and adding a predetermined weight, which is proportional to the difference between the magnitude of the electrical signal and the threshold value, to the counting time and thereby for adjusting the determination time.

When the counting time with the weight is equal to or greater than a predetermined reference time, it determines the determination time has elapsed.

The method further comprises the step of performing the white balance adjustment according to the photographing condition.

The output electrical signal is a hall value, which is detected by a hall sensor, corresponding to the openness of the iris.

In an exemplary embodiment of present invention, if the hall value is equal to or greater than the threshold value, the photographing condition is an indoor place under an artificial light source, and if the hall value is less than the threshold value, the photographing condition is an outdoor place under natural sunlight.

BRIEF DESCRIPTION OF THE DRAWINGS

The above aspects and features of the present invention will be more apparent by describing exemplary embodiments of the present invention with reference to the accompanying drawings, in which:

FIG. 4 is a flow chart illustrating white balance adjustment according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

An exemplary embodiment of the present invention will be described herein below with reference to the accompanying drawings.

The matters defined in the description such as a detailed construction and elements are examples. Thus, it is apparent that the present invention can be performed without those defined matters. Also, well-known functions or constructions are not described in detail for clarity and conciseness.

Figure 1:
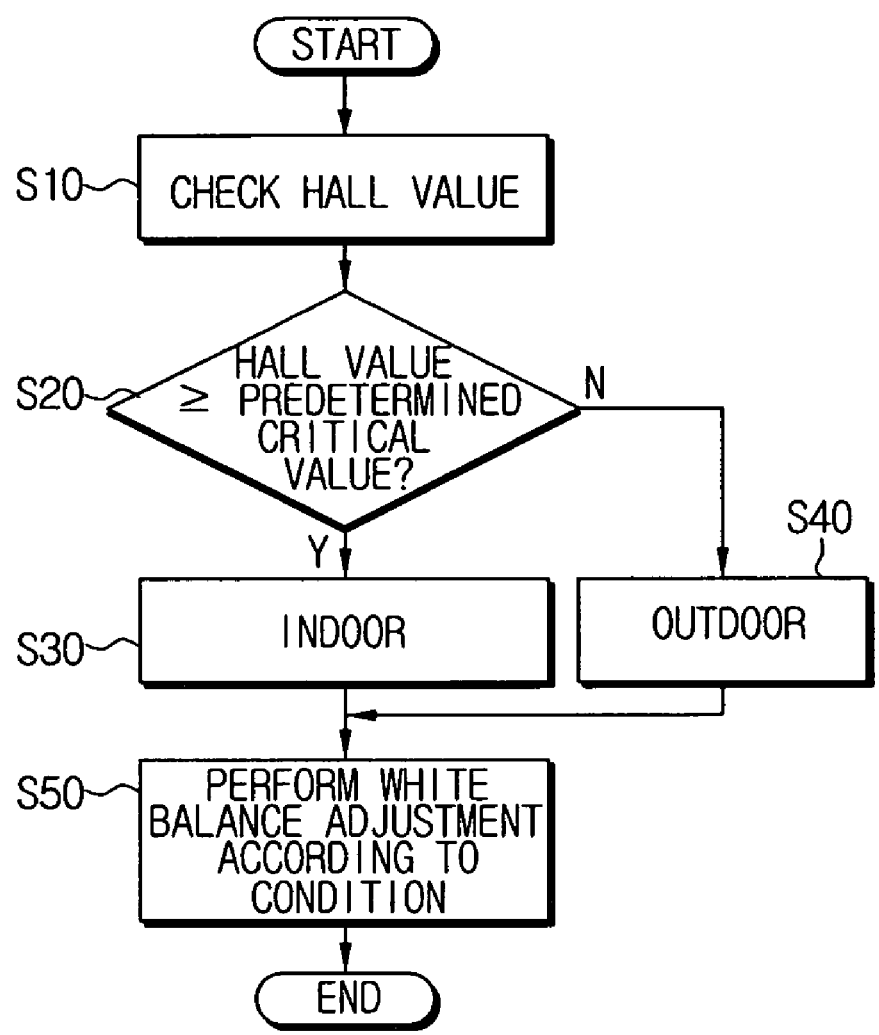
FIG. 1 is a flow chart illustrating a conventional method for white balance adjustment in a digital video camera.
Figure 2:
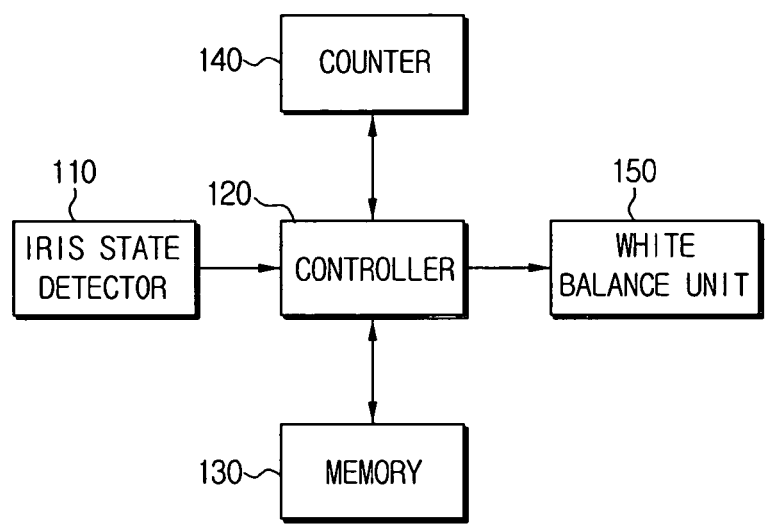
FIG. 2 is a schematic block diagram illustrating a digital video camera according to an exemplary embodiment of the present invention.

FIG. 2 is a schematic block diagram illustrating a digital video camera according to an exemplary embodiment of the present invention. As shown in FIG. 2, the digital video camera comprises an iris state detector 110, a controller 120, a memory 130, a counter 140, and a white balance unit 150. The digital video camera has an automatic white balance function. As aforementioned, in automatic exposure mode, the openness of the iris is adjusted according to the lighting conditions in order to create an optimal exposure setting for the film condition.

When automatic exposure mode is established, the iris state detector 110 outputs an electrical signal of a predetermined magnitude depending on the openness of the iris.

The counter 140, under the control of the controller 120, counts the amount of time that has elapsed after the output of the electrical signal from the iris state detector 110.

The controller 120 compares the magnitude of the electrical signal output from the iris state detector 110 with a predetermined threshold value saved in the memory 130. If the magnitude of the electrical signal is equal to or greater than the threshold value, the controller 120 determines that photographing is taken indoors, but if the magnitude of the electrical signal is less than the threshold value, the controller determines that photographing is taken outdoors. On the other hand, as described above, if the magnitude of the signal and the threshold value are very close the white balance adjustment can be changed. In such case, the controller 120 reserves the determination on the photographing condition for a certain period of time until the electrical signal is fixed in a certain degree. To this end, the controller 120 adjusts the determination time on the photographing condition.

To adjust the determination time, the controller 120 controls the counter 140 to count the amount of time elapsed since the output of the electrical signal from the iris state detector 110. Next, the controller 120 measures the difference between the magnitude of the electrical signal output from the iris state detector 110 and the threshold value saved in the memory 130. Then the controller 120 adds a weight, which is variable depending on the difference, to the amount of time provided by the counter 140. Later the controller 120 compares the summation result with a predetermined reference time, and if the summation result is equal to or greater than the reference time it determines that the determination time has elapsed. Here, the weight is proportional to the difference between the magnitude of the electrical signal and the threshold value. That is, the greater the difference between the magnitude of the electrical signal and the threshold value is, the larger the weight gets and the sooner the determination time comes. In contrast, if the magnitude of the electrical signal is close to the threshold value, a relatively smaller weight is added and slowing down the determination time.

When it determines that the determination time is elapsed, the controller 120 makes a determination on the photographing condition following the above procedure.

After determining the photographing condition, the controller 120 controls the white balance unit 150 to perform the white balance adjustment according to the photographing condition. White balance adjustment is based on the principle that the color difference signals (R-Y, B-Y) among the components of a white balance signal, 100% pure white, are "0", respectively. In other words, the white balance unit 150 extracts only white or achromatic color component among the output signal, and controls weights of red and blue lights so that the color difference signals thereof become "0", respectively.

The white balance adjustment changes depending on the photographing condition. For instance, if a photograph is taken in an indoor place, the color signal has more of the red component. Thus, the white balance unit 150 either amplifies the blue component of the output color signal or reduces the red component by adjusting the weight of the color signal. On the other hand, if a photograph is taken in an outdoor place, the color signal has more of the blue component. In this case, the white balance unit 150 amplifies the red component or reduces the blue component of the output color signal by adjusting the weight of the color signal.

The iris state detector 110 utilizes a hall sensor to detect the status of the iris. The hall sensor outputs a voltage proportional to the openness of the iris. As such, the iris state detector 110 converts the output voltage from the hall sensor into a digital value and outputs it as a hall value. The controller 120 compares then the hall value with the threshold value, and adjusts the determination time on the photographing condition.

Figure 3:
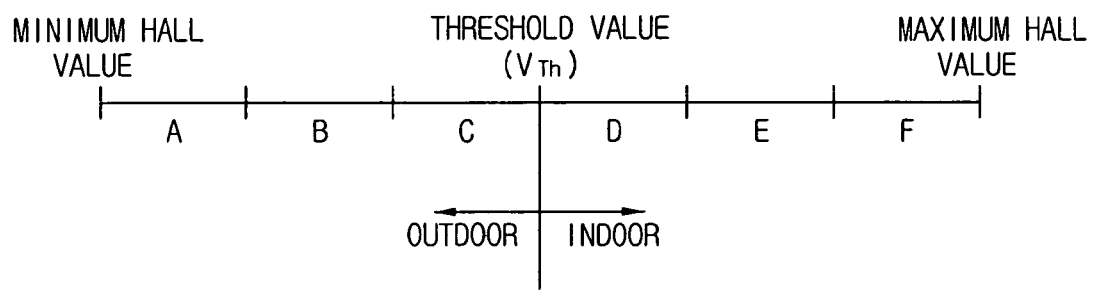
FIG. 3 is a schematic diagram illustrating a procedure for determining a photographing condition according to a hall value.

FIG. 3 is a schematic diagram illustrating a procedure for determining a photographing condition according to the hall value. Referring to FIG. 3, the intermediate value between a maximum value and a minimum value of the hall value is designated as the threshold value, $V_{Th}$. However, this is an empirical value and thus, can be changed. If the hall measurement is less than the threshold value the controller 120 determines that a photograph is taken outdoors, but if the hall measurement is equal to or greater than the threshold value the controller 120 determines that a photograph is taken indoors.

As described above, to adjust the determination time the controller 120 adds to the counting time a weight that is proportional to the difference between the hall value and the threshold value. In this case, as shown in FIG. 3, the weight can be determined by dividing the hall value at regular intervals. That is to say, the range from the maximum hall value and the minimum hall value is divided from intervals A to F, and a predetermined weight is designated to each interval. For example, it assumes that the weights designated to the intervals A to F are $\alpha$, $\beta$, $\gamma$, $\gamma$, $\beta$, and $\alpha$, respectively. Then the weights $\alpha$, $\beta$ and $\gamma$ satisfy a relation of $\alpha > \beta > \gamma$. To be short, if the detected hall value itself is sufficient to determine the photographing condition in other words whether it is indoor or outdoor, the controller 120 adds a relatively large weight '$\alpha$' to move up the determination time. On the other hand, if the detected hall value belongs to the intervals C and D that are very close to the crucial value, the controller 120 adds a relatively small weight '$\gamma$' to slow down the determination time. If greater hall values in the C and D intervals are detected consecutively, the controller 120 determines based on the detection result, whether a photograph is taken outdoors or indoors.

For instance, it assumes that the iris state detector 110 is to output a hall value at the frequency of 1/60 sec, $\alpha=4/60$, $\beta=2/60$ and $\gamma=1/60$, and the reference decision time=4/60 sec. The data on the reference time and weights can be recorded additionally in the memory 130.

In the first case, if a hall value is detected first from the A or F interval the counting time is zero and the weight is 4/60. Because the determination time with the weight equals to the reference time, the controller 120 determines that a photograph is taken in an outdoor or indoor place.

In the second case, if a hall value is detected first from the B or E interval the counting time is zero and the weight is 2/60, which is less than the reference time. Thus the controller 120 checks a hall value again. If the hall value is detected from the B or E interval again the counting time is 2/60 and the weight is 2/60, which equals to the reference time. Therefore, the controller 120 determines that a photograph is taken in an outdoor or indoor place.

In the third case, if a hall value is first detected from the B or E interval and then the C or E interval, the counting time is 2/60 and the weight is 1/60, which is less than the reference time. Thus, the controller checks a hall value again. If the hall value is detected from the C or D interval one more time the counting time equals to the reference time. Therefore, the controller 120 determines that a photograph is taken in an outdoor or indoor place. Once the photographing condition is determined, the counter 140 is reset.

FIG. 4 is a flow chart illustrating white balance adjustment according to an exemplary embodiment of the present invention. Referring to FIG. 4, when automatic exposure mode is set, the iris is adjusted depending on the light intensity at step S410. Next, the iris state detector 110 outputs an electrical signal with a predetermined magnitude corresponding to the openness of the iris at step S420. If the hall sensor is used, the output electrical signal can be the hall value. In such case, the iris state detector 110 outputs an electrical signal at predetermined intervals.

The controller 120 controls the counter 140 to count the amount of time that has elapsed since the output of the electrical signal from the iris state detector 110 at step S430.

The controller 120 measures the difference between the magnitude of the output electrical signal and a threshold value at step S440. The threshold value is preset and saved in the memory 130.

The controller 120 adds to the counting time a weight proportional to the subtraction result at step S450 in order to adjust the determination time.

The controller 120 checks whether the counting time with the weight is greater than the predetermined reference time at step S460 and if so, it determines the photographing condition at step S470.

After determining whether the photographing condition is outdoor or indoor, the controller 120 controls the white balance unit 150 to perform the white balance adjustment according to the photographing condition at step S480.

As such, under certain circumstances where the photographing condition changes often, the controller 120 takes greater time to determine the photographing condition. In this manner, the frequency of white balance adjustment with respect to any subtle changes in the photographing condition can be reduced markedly.

In conclusion, the digital video camera according to exemplary embodiments of the present invention is capable of determining the photographing condition according to the status of the iris, and adjusting the determination time thereof. That is, if a photograph is taken in a very bright place the camera knows that it is an outdoor, and if a photograph is taken in a very dark place the camera also knows that it is an indoor. On the other hand, if the lighting is neither too bright nor too dark, the camera reserves the determination on the photographing condition and takes more time to make a more accurate determination. As a result, the white balance adjustment becomes more accurate and is performed only needed. The improvement in the white balance adjustment consequently enables the camera to display more natural color images on a screen.

The foregoing exemplary embodiments of present invention and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A digital video camera with an automatic exposure, comprising:
   an iris state detector for outputting an electrical signal with a predetermined magnitude corresponding to a status of an iris;
   a memory for saving a threshold value to be compared with the magnitude of the electrical signal; and
   a controller for comparing the magnitude of the electrical signal output from the iris state detector with the threshold value to determine a determination time of a photographing condition, and determining the photographing condition according to the difference between the magnitude of the electrical signal and the threshold value after the determination time is elapsed,
   wherein the controller slows down the determination time of the photographing condition if the magnitude of the electrical signal is close to the threshold value.

2. The digital video camera according to claim 1, further comprising:
   a counter for counting the amount of time elapsed after the output of the electrical signal from the iris state detector.

3. The digital video camera according to claim 2, wherein the controller adds a predetermined weight, which is proportional to the difference between the magnitude of the electrical signal and the threshold value, to the counting time provided from the counter, and if the counting time with the weight equals to a predetermined reference time, the controller determines that the determination time has elapsed and thus determines the photographing condition.

4. The digital video camera according to claim 3, further comprising:
   a white balance unit for performing white balance adjustment according to the photographing condition provided by the controller.

5. The digital video camera according to claim 1, wherein the iris state detector outputs a hail value corresponding to the openness of the iris by means of a hall sensor.

6. The digital video camera according to claim 5, wherein if the hall value is equal to or greater than the threshold value the controller determines that the photographing condition is an indoor place under an artificial light source, and if the hall value is less than the threshold value the controller determines that the photographing condition is an outdoor place under natural sunlight.

7. A method of white balance adjustment in a digital video camera with automatic aperture, the method comprising the steps of:
   outputting an electrical signal with a magnitude corresponding to the status of the iris;
   calculating a difference between the magnitude of the electrical signal and a predetermined threshold value;
   adjusting a determination time on a photographing condition of the digital video camera in accordance with the difference; and
   comparing the magnitude of the electrical signal with the threshold value after the determination time is elapsed, and determining the photographing condition based on the comparison result,
   wherein adjusting the determination time on the photographing condition comprises slowing down the determination time on the photographing condition if the magnitude of the electrical signal is close to the threshold value.

8. The method according to claim 7, wherein the stop of adjusting the determination time on the photographing condition comprises the sub-steps of:
   counting the amount of time elapsed since the output of the electrical signal; and
   adding a predetermined weight, which is proportional to the difference between the magnitude of the electrical signal and the threshold value, to the counting time and thereby, adjusting the determination time.

9. The method according to claim 8, wherein if the counting time with the weight is equal to or greater than a predetermined reference time, determining that the determination time has elapsed.

10. The method according to claim 7, further comprising the step of:
    performing the white balance adjustment according to the photographing condition.

11. The method according to claim 7, wherein the output electrical signal is a hall value, which is detected by a hall sensor, corresponding to the openness of the iris.

12. The method according to claim 11, wherein if the hall value is equal to or greater than the threshold value the photographing condition is an indoor place under an artificial light source, and if the hall value is less than the threshold value the photographing condition is an outdoor place under natural sunlight.

* * * * *